G. W. LALLY.
COMBINED DUMPING AND REAR END ELEVATING VEHICLE BODY.
APPLICATION FILED DEC. 2, 1918.
1,387,413.
Patented Aug. 9, 1921.
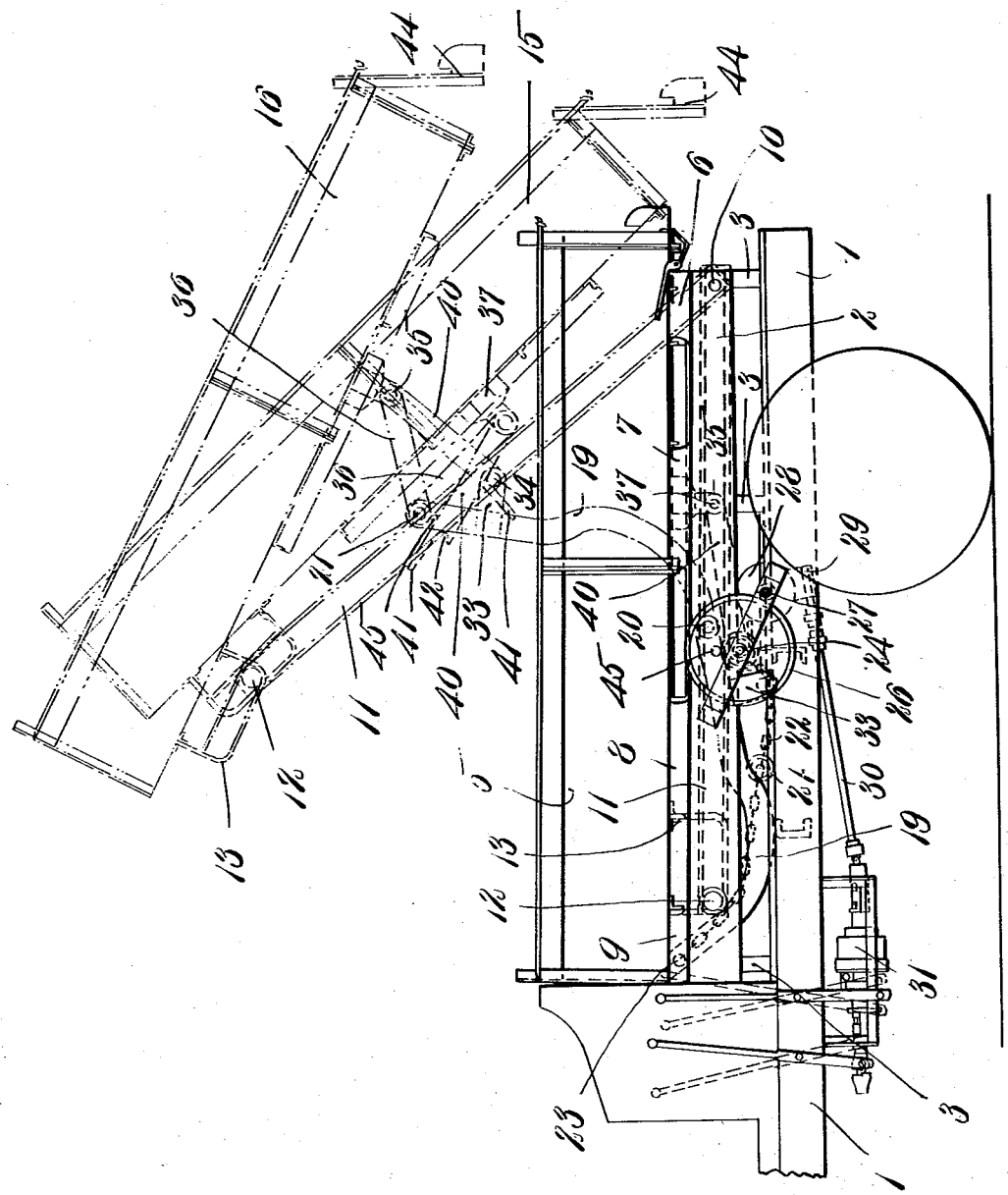
Inventor:
George W. Lally
by [illegible] atty.

UNITED STATES PATENT OFFICE.

GEORGE W. LALLY, OF BOSTON, MASSACHUSETTS, ASSIGNOR TO THE LALLY COMMERCIAL BODY COMPANY, OF EVERETT, MASSACHUSETTS, A CORPORATION OF MASSACHUSETTS.

COMBINED DUMPING AND REAR-END-ELEVATING VEHICLE-BODY.

1,387,413.  Specification of Letters Patent.  Patented Aug. 9, 1921.

Application filed December 2, 1918. Serial No. 264,940.

*To all whom it may concern:*

Be it known that I, GEORGE W. LALLY, a citizen of the United States, and a resident of Boston, Massachusetts, (whose post-office address is 26 Paris street, Everett, Massachusetts), have invented an Improvement in Combined Dumping and Rear-End-Elevating Vehicle-Bodies, of which the following description, in connection with the accompanying drawings, is a specification, like letters on the drawings representing like parts.

My present invention relates to vehicles having a vehicle body adapted for being raised or tilted about an angle or used in dumping coal, gravel, stone, and other articles, and the object of the present invention is to provide such a vehicle that it may be utilized either to incline the dumping body about a pivot at the rear end or to both incline the body and elevate the rear end. This is of particular importance in many kinds of vehicles, particularly in large automobile coal trucks where a load of several tons is handled and owing to the varieties of work for such vehicles, it is some times essential to incline the dumping body at as sharp an angle and on as small a pivot at the rear end of the vehicle, as the construction will permit,—and at other time, it is important to elevate the entire body—particularly at the rear end in order to give a long chute for the coal being discharged. Simple, novel, and efficient means are shown herein for accomplishing this variation in the structure of the apparatus and without any change in the hoisting devices. While I have herein illustrated the invention as applied to a standard type of automobile truck, such for example as that shown in my prior U. S. Patent No. 1,158,812, issued November 2, 1915, and utilizing the type of hoisting device shown in U. S. Patent No. 1,226,384, issued May 15, 1918, it will be understood that the combined dumping and rear elevating features and advantages of construction are applicable to other vehicles and uses.

In carrying out the invention, I prefer to use a type of detachable pawl or arm which can be thrown into position to elevate the rear end of the vehicle body when desired or can be allowed to lie idle, as desired. This type of pawl is illustrated in my said prior patent, No. 1,158,812, wherein it was employed as an element in lifting or hoisting the forward portion of a dumping vehicle, but as herein shown, I have utilized a somewhat similar element but for an entirely different purpose and to secure a new result.

Referring to the drawing illustrating a preferred embodiment, 1 designates a portion of the chassis of a truck of well-known automobile type on which chassis is mounted a framework comprising a pair of side members 2, each substantially parallel with the side bars of the chassis 1 and being supported thereon by a plurality of studs 3, 3, 3, on each side. Mounted to rest upon this frame 2 is the movable dumping body 5 of suitable size and strength to carry the load for which the truck is intended. The body 5 rests upon the side frames 2 when in lowered position, blocks 6, 7, 8, and 9 on each side providing resting bearings. Supported upon a pivot 10 at the rear end of the side frame 2, is a pair of bars 11, the said bars extending forwardly from the pivot 10 and being united at their front ends by a bolt 12, the latter engaging a slideway in the frame 13 depending from the forepart of the body 5. This framework is movable about the pivot 10 and the arrangement of the bolt 12 and slide 13 permits a certain amount of rearward bodily movement of the dumping body 5 when it is raised into position, indicated at 15 in dotted lines. This position shows the angle of inclination possible with my construction, with the dumping body being swung about the pivot 10 and position 16 illustrating the inclination and elevation of the dumping body when the rear elevating link arms or pawls are thrown into position, as will be explained.

The hoisting devices for use with the rear end elevating links may be of various type, but I prefer to employ the hoisting mechanism comprising pairs of bent arms such as illustrated in said prior patent, No. 1,226,384. This pair of hoisting arms comprise the grooved arms of members 19 which are pivotally secured at each side of the vehicle adjacent the movable frames 11 at 20 and these arms roll upon grooved rollers 21 as they are moved or swung into hoisting position by the chains 22, secured at 23 to the outer or free ends of each link arm 19; the chains are wound around a shaft 24 which is rotated by a gear 26, pinion 27, and gear 28, the latter preferably being arranged for operation by power through a worm 29 rotated by the shaft 30 and with suitable clutch connections 31 with the power shaft of the automobile engine. The train of gears can be rotated by hand, when desired, in the usual manner. Projecting from the side arms 19 near the pivoted end 20 is a link 33, these links extending substantially in right angles to the bar 19 where they are secured and with the outer ends of these links on each bar 19 connected by a rod 34. The chains 22 are each led around this rod 34 and thence upwardly, with the hoisting mechanism in lowered position, to the shaft 24, thus allowing for the substantially vertical lifting thrust on the hoisting apparatus at the beginning of the winding of the chains 22 on the shaft 24. The outer ends of the chains also are led around the rod 12 bearing thereon when the mechanism is lowered. Rotation of the shaft 24 and the winding in of the chains 22 will thus move the link arms 19 and the frame 11 and vehicle body 5 upwardly into inclined position with the body portion on the pivoted frame 11.

To provide for the adjustable rear end elevating feature, I prefer to support the vehicle body rearwardly of its center at a point to give a broad spaced bearing, approximately at 35 as shown, providing a pair of link arms 36 extending from the pivots 21 joining the link arms to the levers 19, thence to the frame 11 at 35. At this same point are secured at each side, the detachable links or pawl arms 40. These arms have the lower end formed with a long projecting finger 41 and a semicircular bearing 42 adapted to fit over the rod 34 adjacent the links 33 and thus to elevate the rear end of the dumping body, as clearly shown in position 16.

With the dumping vehicle at rest, these pawls 40 are out of position and rest across the shaft 24. During the hoisting action however, the long finger 41 will be picked up by the rod 34 uniting the link arms 33 and thereupon the continued hoisting action of the levers 19 will seat said rod 34 in the curved recesses 42 of each pawl arm 40 and thus act to elevate the rear end of the vehicle during the completing of the hoisting action, the vehicle body being bodily moved rearwardly, but also sliding relatively forwardly for the distance allowed for the slide 13, thus tending to hold the body over the center of gravity of the rear wheels, the links 36 and pawls 40 effecting this movement. This arrangement also gives a strong bracing and rigid support for the dumping body even when elevated to the extreme upward position, as shown at 16 and also produces a relatively sharp inclined angle, so that coal, gravel, sand, etc., will be quickly discharged upon the opening of the rear gate 44.

If it is not desired to have the rear elevating pawls in operation, they may be held upwardly against latches 45, 45, and thereupon the body will assume the position as illustrated at 15, being moved slightly rearwardly through the elevating action of the pawls 40 bearing between the rods 34 and said latches 45.

My present invention is further described and defined in the form of claims as follows:

1. Apparatus of the kind described comprising a vehicle body adapted to be raised in an inclined position, hoisting means for raising the front end of said body at an inclined position and means operable at will to automatically elevate the rear end of said body while maintaining the same inclined, said means comprising arms, each having a projecting finger-like member to engage a lifting portion at will.

2. Apparatus of the kind described comprising a vehicle body adapted to be raised in an inclined position, hoisting means for raising the front end of said body at an inclined position and rear elevating means operable at will to raise the rear end of said body, including a pair of pawl arms secured to said vehicle body, and adapted to be positioned for action or inaction.

3. Apparatus of the kind described adapted to raise a vehicle body at an inclined position with means operable at will to elevate the rear end of the vehicle body, comprising a pair of hoisting levers, means to raise said levers to incline the vehicle body and a pair of pawl arms in position to engage the hoisting levers at a predetermined point during the elevating action and to elevate the rear end of the body, and means to maintain said pawl arms out of action.

4. Apparatus of the kind described adapted to raise a vehicle body at an inclined position with means operable at will to elevate the rear end of the vehicle body, comprising a pair of hoisting levers, means to raise said lever to incline the vehicle body, a rod secured to short links on the hoisting levers and uniting said links, a pair of pawl arms pivoted to the rear portion of the vehicle body and having means to automatically engage said rod at a predetermined point in the hoisting action of the levers and means to render said pawl arms operable or inoperable at will, whereby the hoisting apparatus can be interchangeably used to incline the vehicle body or to both incline and elevate the entire vehicle body.

In testimony whereof, I have signed my name to this specification, in the presence of two subscribing witnesses.

GEORGE W. LALLY.

Witnesses:
 JAMES R. HODDER,
 RACHAEL G. LESLIE.